(12) United States Patent
Jacobs et al.

(10) Patent No.: US 11,774,194 B2
(45) Date of Patent: Oct. 3, 2023

(54) THERMOACOUSTIC 3D PRINTED STACK AND HEAT EXCHANGER

(71) Applicant: The Government of the United States of America, as represented by the Secretary of Homeland Security, Washington, DC (US)

(72) Inventors: Bryson C. Jacobs, Quaker Hill, CT (US); Patrick T. Irwin, El Dorado, CA (US)

(73) Assignee: The Government of the United States of America, as represented by the Secretary of Homeland Security, Washington, DC (US)

(*) Notice: Subject to any disclaimer, the term of this patent is extended or adjusted under 35 U.S.C. 154(b) by 0 days.

(21) Appl. No.: 17/544,855

(22) Filed: Dec. 7, 2021

(65) Prior Publication Data
US 2022/0244002 A1   Aug. 4, 2022

Related U.S. Application Data

(60) Provisional application No. 63/144,275, filed on Feb. 1, 2021.

(51) Int. Cl.
*F28F 21/06* (2006.01)
*F28F 1/40* (2006.01)
*B33Y 80/00* (2015.01)

(52) U.S. Cl.
CPC .............. *F28F 21/062* (2013.01); *F28F 1/40* (2013.01); *B33Y 80/00* (2014.12)

(58) Field of Classification Search
CPC .... F28F 21/062; F28F 1/40; F28F 1/00; F28F 1/10; F28F 1/14; B33Y 80/00
USPC ........................................................ 165/177
See application file for complete search history.

(56) References Cited

U.S. PATENT DOCUMENTS

| | | | | |
|---|---|---|---|---|
| 2,070,223 A | * | 2/1937 | Butler | F28F 13/16 165/DIG. 123 |
| 2,406,551 A | * | 8/1946 | Lucke | F02F 1/065 165/177 |
| 2,406,552 A | * | 8/1946 | Lucke | F02F 1/08 165/177 |

(Continued)

OTHER PUBLICATIONS

Antonio Piccolo et al., "Comparative Performance of Thermoacoustic Heat Exchangers with Different Pore Geometries in Oscillatory Flow Implementation-of-Experimental-Techniques", Applied Sciences, Aug. 2, 2017, 7, 784; doi: 10.3390/7080784, pp. 1-10, www.mdipi.com/journal/applsci.

(Continued)

*Primary Examiner* — Jianying C Atkisson
*Assistant Examiner* — Raheena R Malik
(74) *Attorney, Agent, or Firm* — Lavanya Ratnam; Robert W. Busby; Kelly G. Hyndman

(57) ABSTRACT

A thermoacoustic stack includes an outer wall which is cylindrical and has a length extending between a first end and a second end. An internal wall structure is disposed inside the outer wall. The internal wall structure includes a plurality of spaced adjacent wall surfaces extending along the length of the outer wall to provide open flow passages between the spaced adjacent wall surfaces. A first cross member extends across the outer wall at the first end and is connected to the outer wall and the internal wall structure at the first end.

28 Claims, 9 Drawing Sheets

(56) References Cited

U.S. PATENT DOCUMENTS

| | | | | | |
|---|---|---|---|---|---|
| 2,440,245 | A | * | 4/1948 | Chevigny | H01J 19/36 165/47 |
| 2,693,026 | A | * | 11/1954 | Simpelaar | F28F 1/14 29/523 |
| 2,703,921 | A | * | 3/1955 | Brown, Jr. | F28D 7/106 29/890.036 |
| 4,054,980 | A | * | 10/1977 | Roma | F28F 21/062 165/172 |
| 4,093,435 | A | * | 6/1978 | Marron | B01D 53/26 55/408 |
| 5,220,954 | A | * | 6/1993 | Longardner | F28D 20/021 165/104.11 |
| 5,882,461 | A | * | 3/1999 | Rogut | B01D 63/02 156/182 |
| 6,070,657 | A | * | 6/2000 | Kunkel | F28F 21/084 165/158 |
| 6,113,782 | A | * | 9/2000 | Leonard | B29C 39/10 264/28 |
| 6,116,290 | A | * | 9/2000 | Ohm | F16L 59/143 138/148 |
| 6,253,573 | B1 | * | 7/2001 | Schwitters | F28D 7/106 62/340 |
| 6,419,009 | B1 | * | 7/2002 | Gregory | F28D 1/053 165/146 |
| 6,434,972 | B1 | * | 8/2002 | Geiger | F28F 1/14 165/184 |
| 9,297,591 | B1 | * | 3/2016 | von Hack-Prestinary | F03G 7/04 |
| 11,084,077 | B2 | * | 8/2021 | Hedblom | F16L 9/18 |
| 11,209,219 | B1 | * | 12/2021 | Youchison | F28F 13/003 |
| 2002/0083733 | A1 | * | 7/2002 | Zhang | F28D 7/14 62/509 |
| 2010/0328837 | A1 | * | 12/2010 | Lee | H01T 23/00 361/231 |
| 2011/0308270 | A1 | * | 12/2011 | Maeng | F25B 40/00 62/335 |
| 2013/0192804 | A1 | * | 8/2013 | Matsuda | F28D 7/10 165/154 |
| 2014/0262185 | A1 | * | 9/2014 | Raina | F28D 7/022 29/890.036 |
| 2015/0159965 | A1 | * | 6/2015 | Horng | F28F 1/40 165/181 |
| 2015/0168074 | A1 | * | 6/2015 | Bariar | B21D 53/06 29/890.036 |
| 2018/0345353 | A1 | * | 12/2018 | Martin | F28D 9/0012 |

OTHER PUBLICATIONS

Praitoon Chaiwongsa, Somchai Wongwises, "Effect of the Blockage Ratio of Circular Stack on the Performance of the Air-based Standing Wave Thermoacoustic Refrigerator using Heat Pipe", Case Studies in Thermal Engineering, Jan. 2021, https://doi.org/10.1016/j.csite.2021.100843.

Shintaro Kataoka and Shin-Ichi Sakamoto, "Measurement of temperature distribution with 3D-printer and etching meshes stack in thermoacoustic heat pump", Proceedings of Symposium on Ultrasonic Electronics, vol. 40, Nov. 25-27, 2019.

Prajwal C. Bansod, Ashish S. Raut, "Review on Thermoacoustic Refrigeration", International Journal of Innovations in Engineering and Science, vol. 2, No. 3, 2017, e-ISSN:2456-3463, www.ijies.net.

* cited by examiner

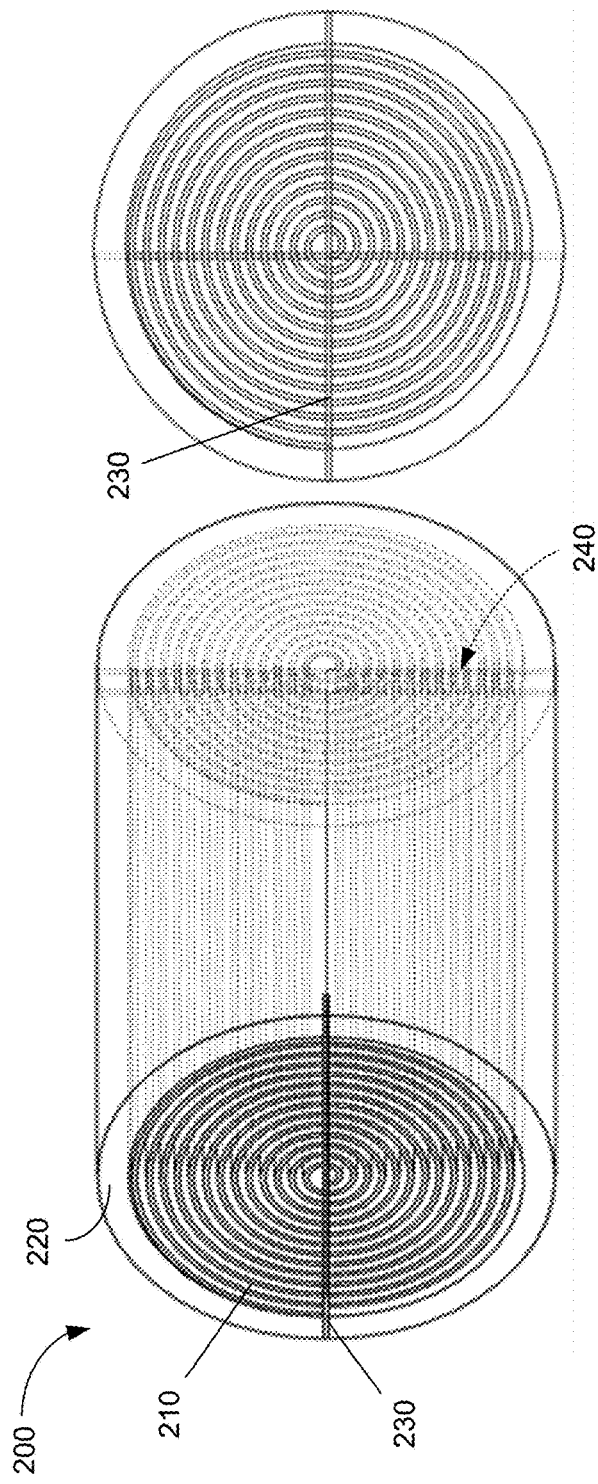
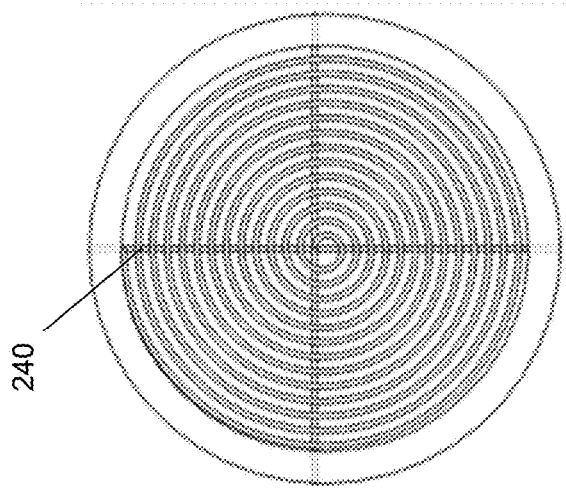

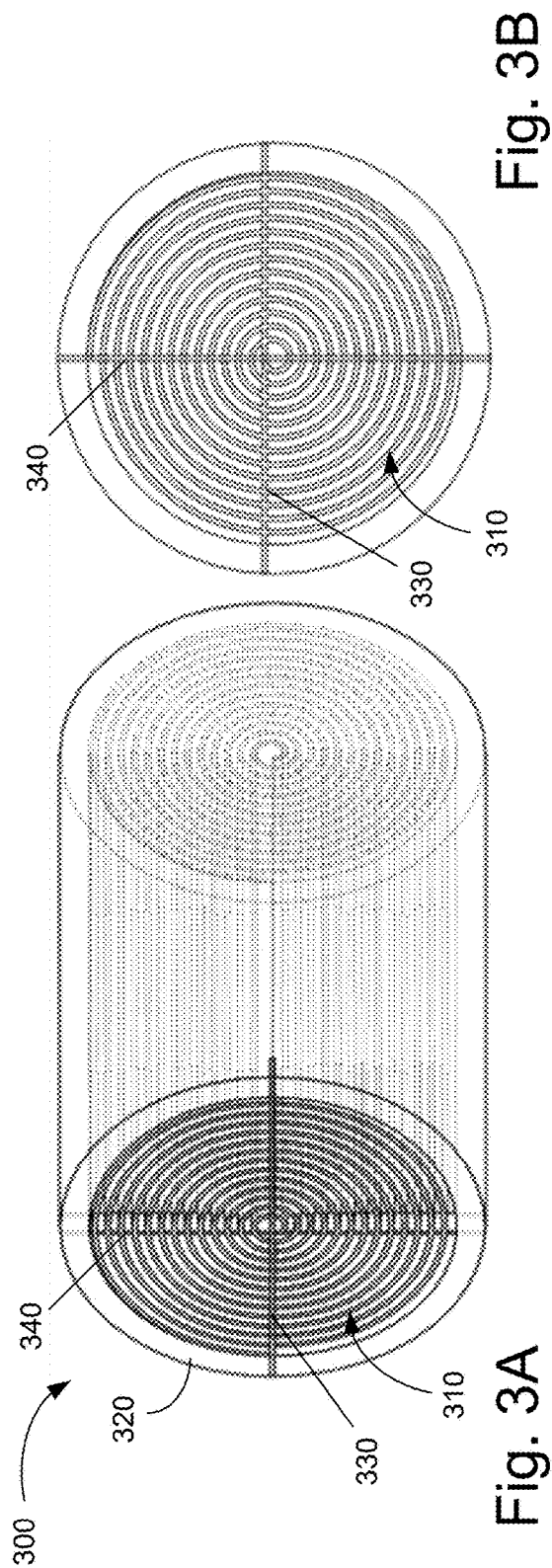
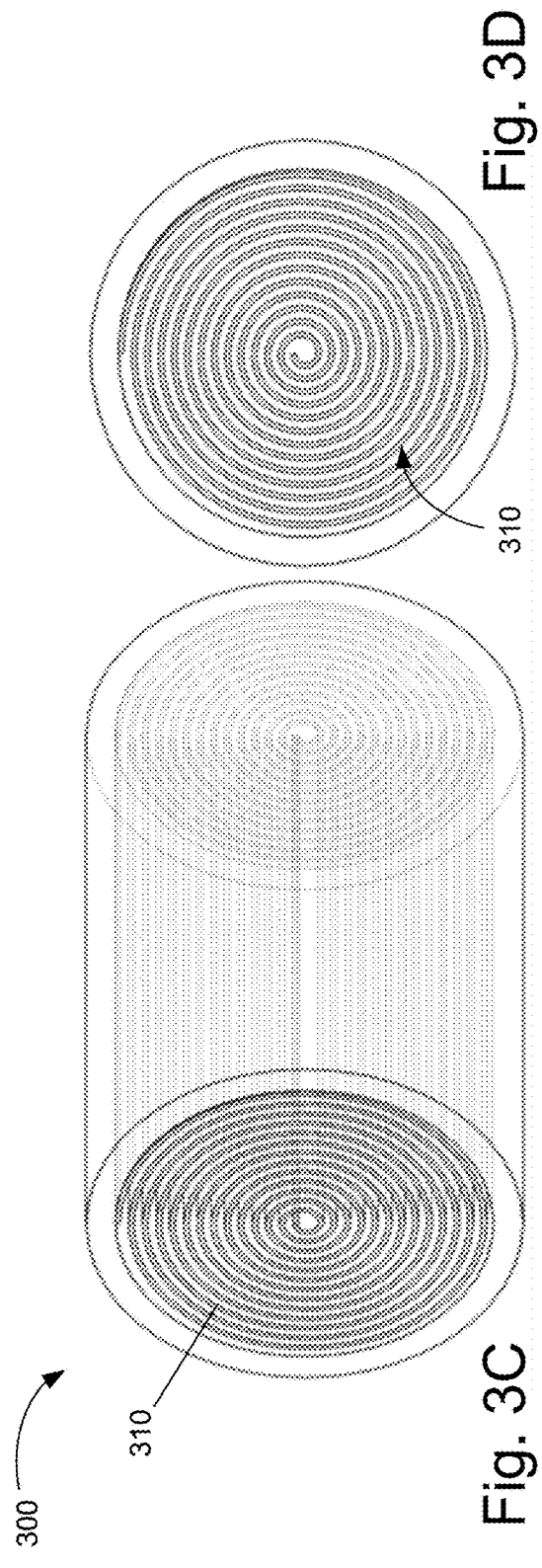

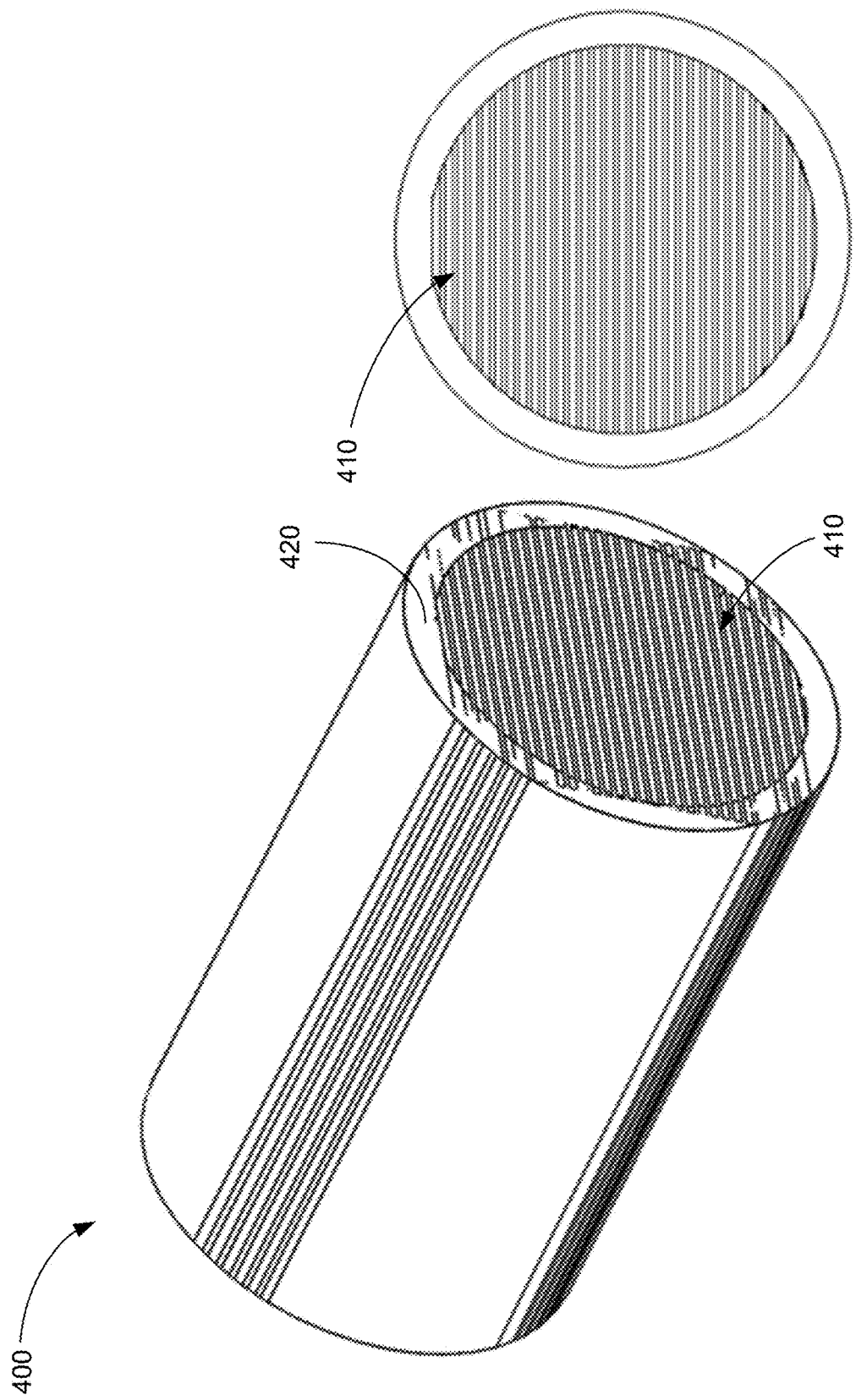

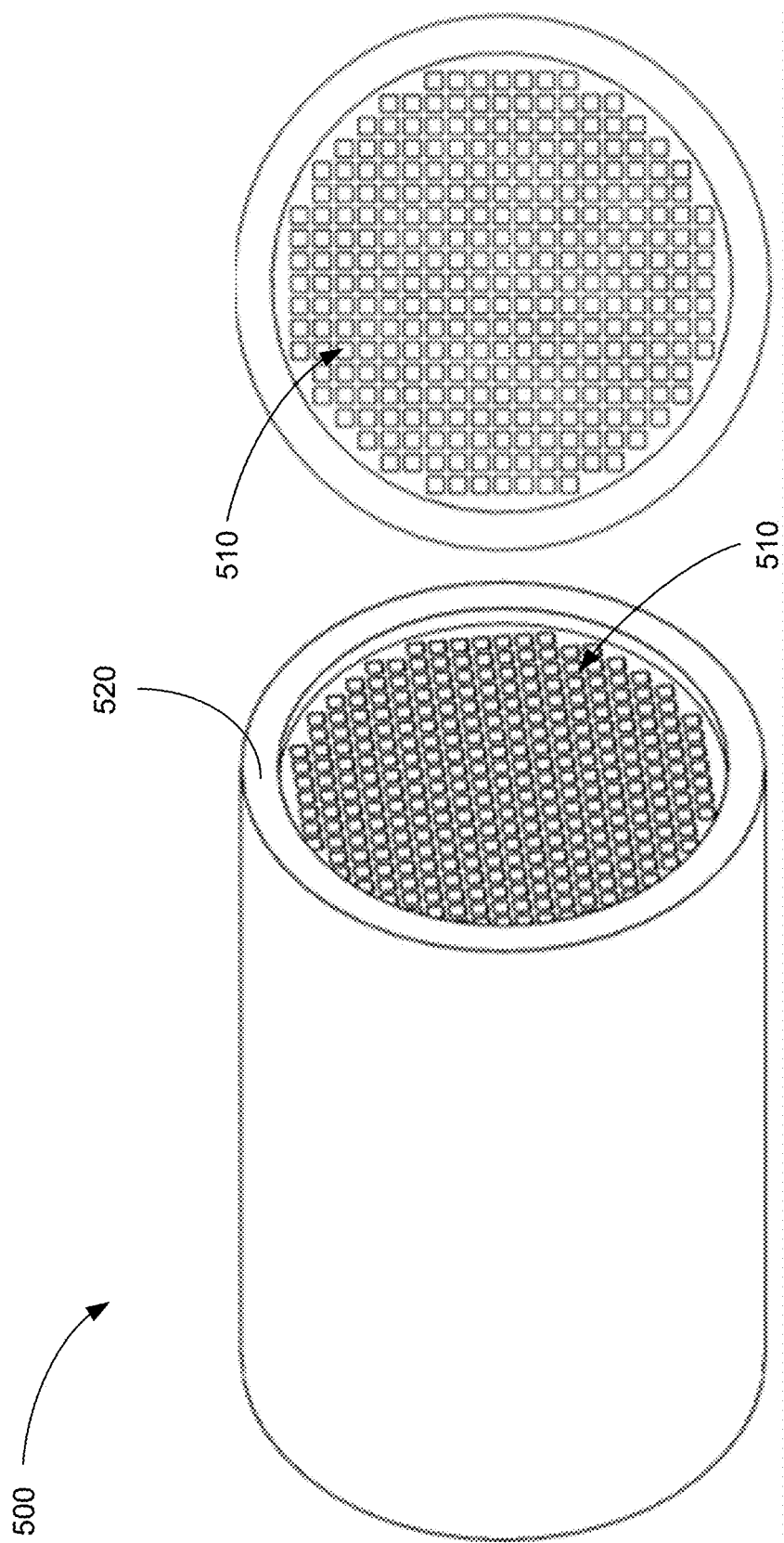

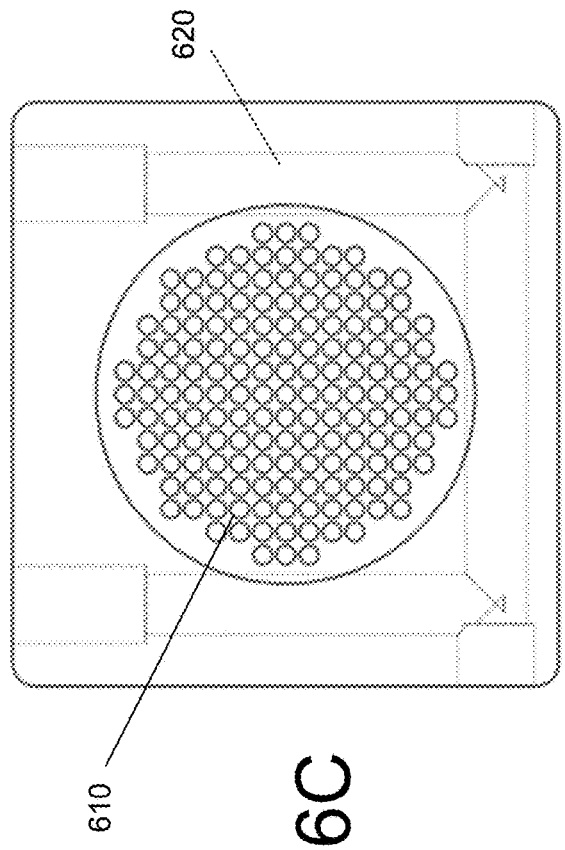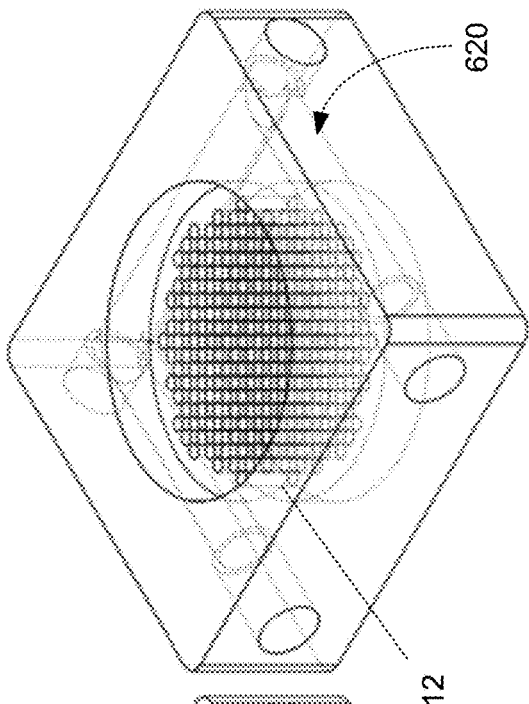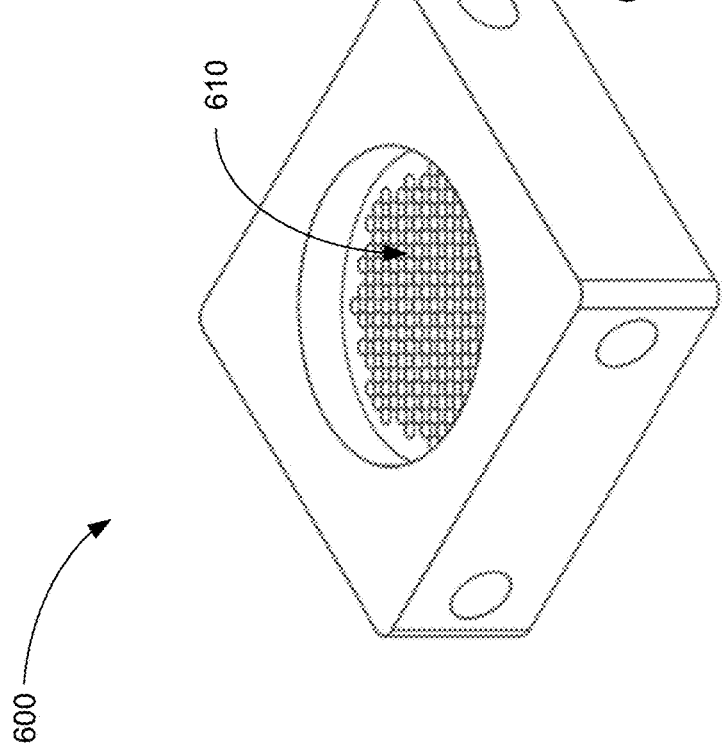

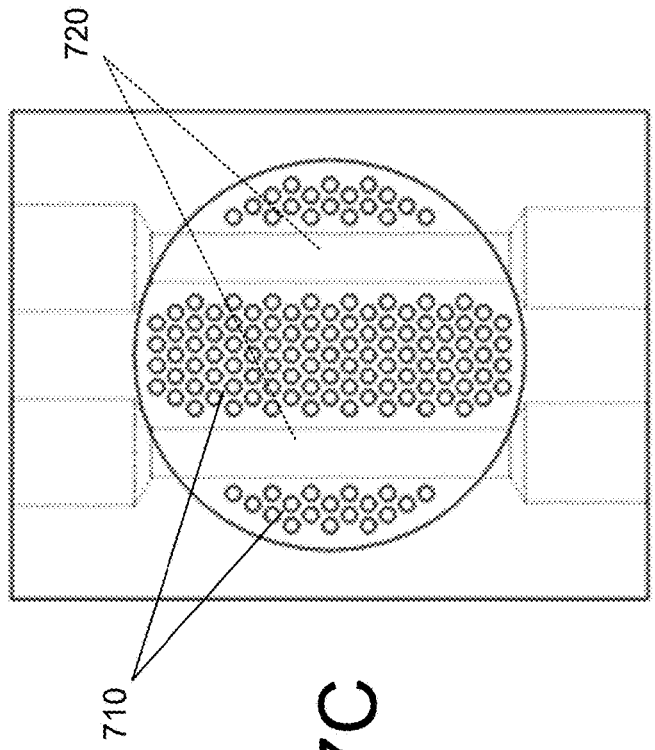
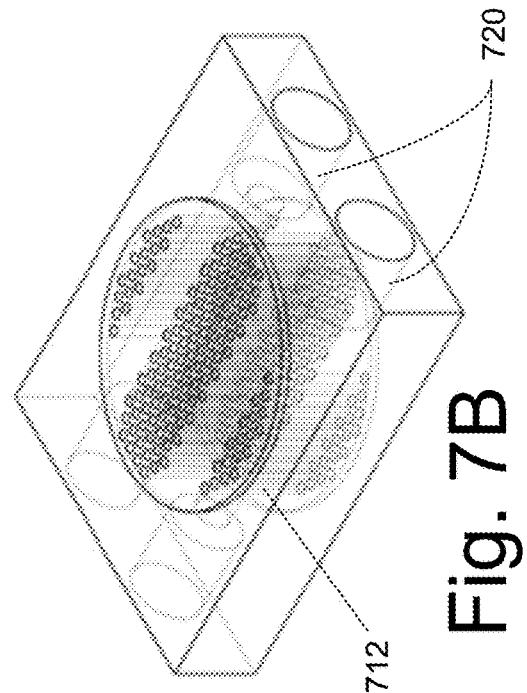
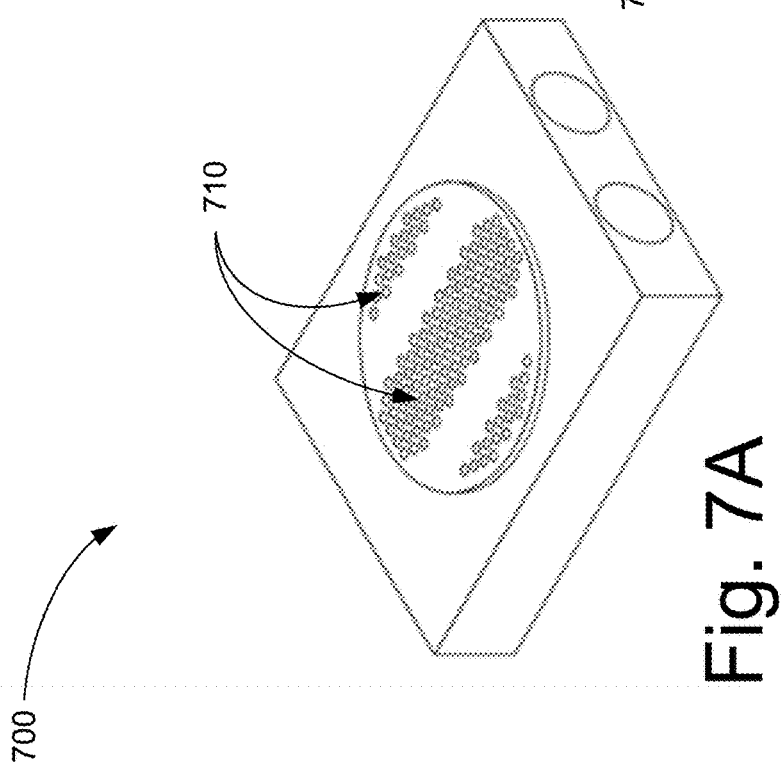
Fig. 7C
Fig. 7B
Fig. 7A

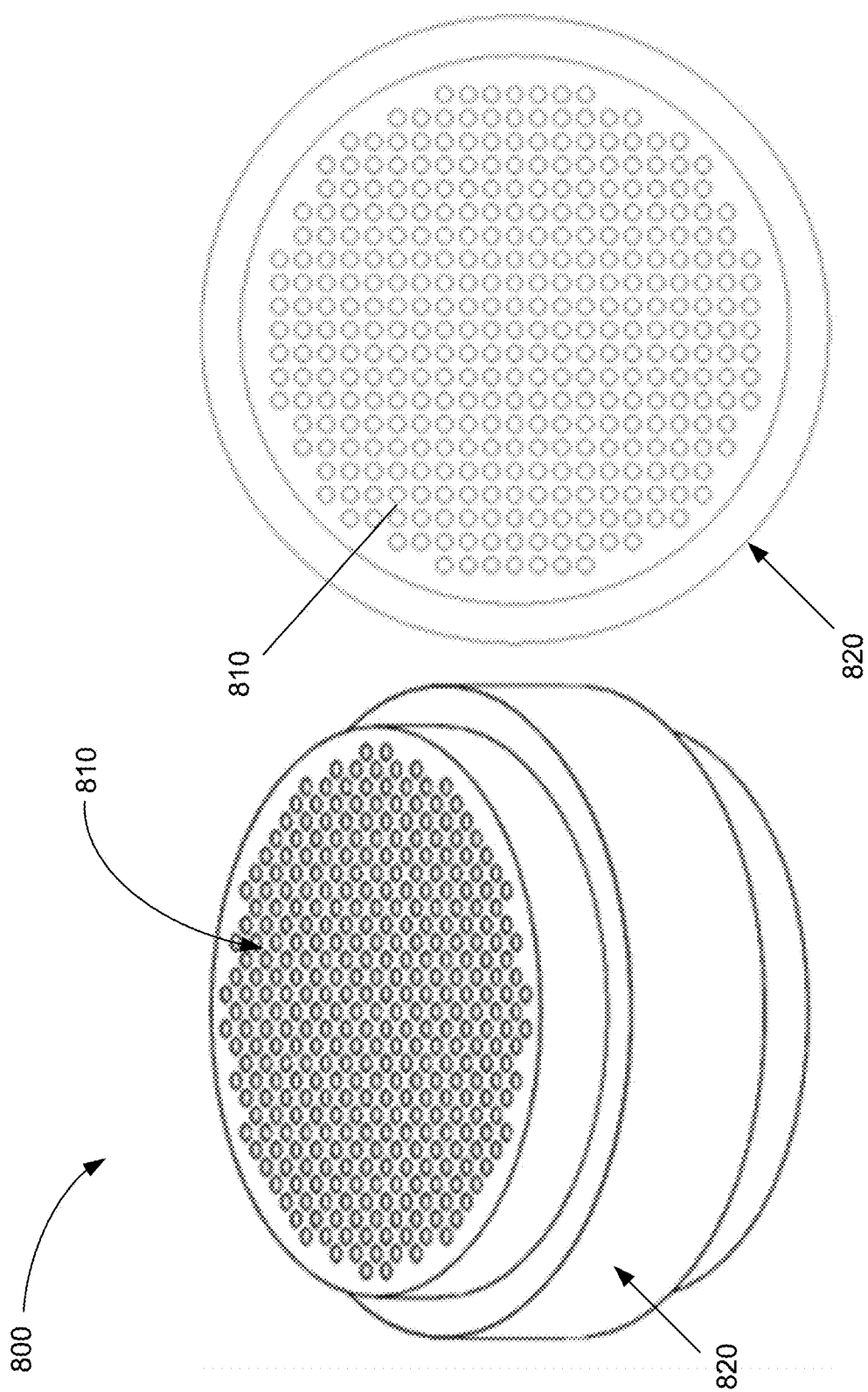

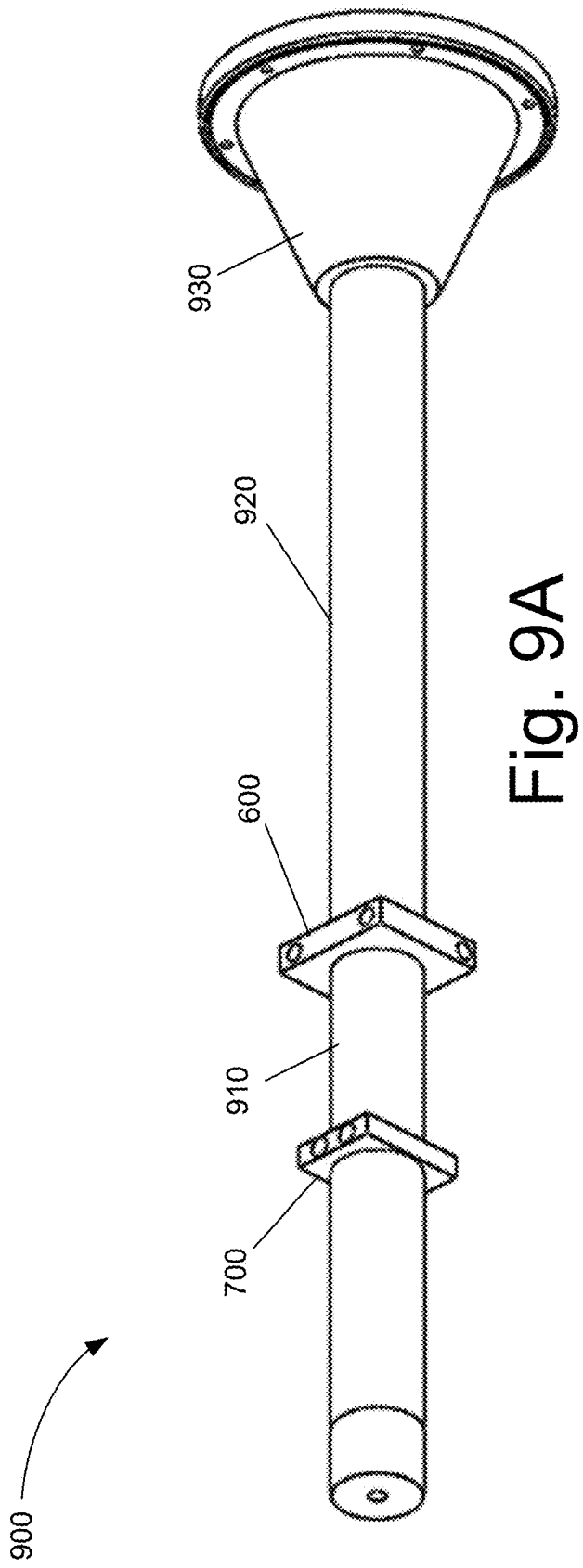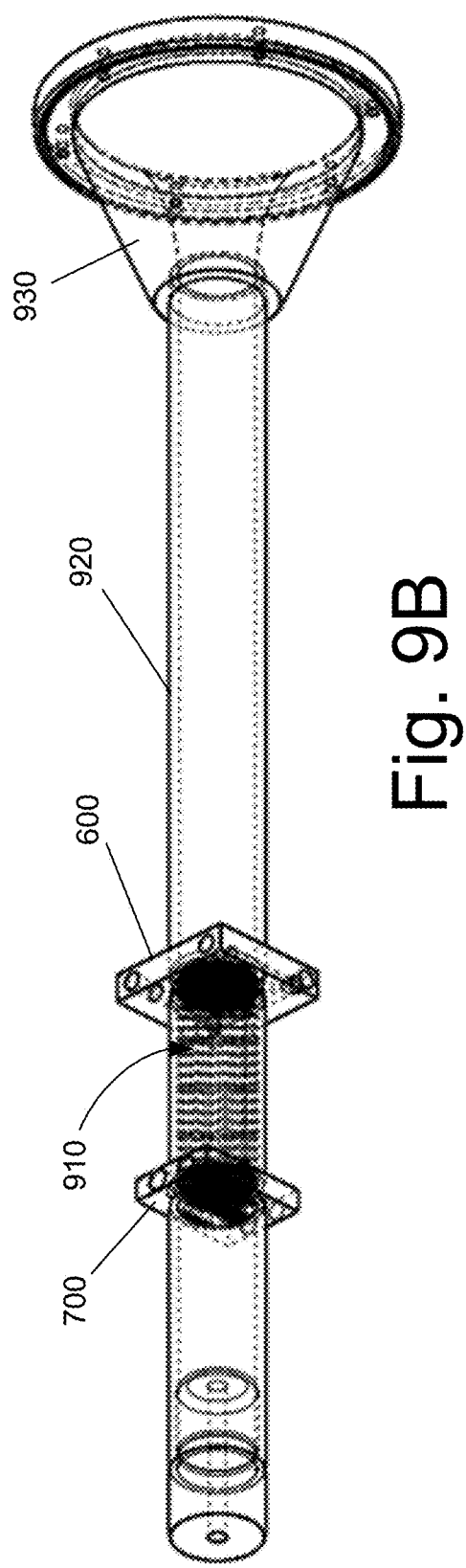

THERMOACOUSTIC 3D PRINTED STACK AND HEAT EXCHANGER

CROSS-REFERENCE TO RELATED APPLICATIONS

The application claims the benefit of priority from and is a non-provisional of U.S. Provisional Patent Application No. 63/144,275, filed on Feb. 1, 2021, entitled THERMOACOUSTIC 3D PRINTED STACKS AND HEAT EXCHANGERS, the disclosure of which is incorporated by reference in its entirety.

STATEMENT OF GOVERNMENT INTEREST

The present invention was made by employees of the United States Department of Homeland Security in the performance of their official duties. The U.S. Government has certain rights in this invention.

FIELD

The discussion below relates generally to thermoacoustic stacks and heat exchangers and, more particularly, to thermoacoustic stacks and heat exchangers having configurations designed for additive manufacturing with low thermal conductivity and relatively high heat capacity.

BACKGROUND

Thermoacoustic heat pumps and refrigerators use acoustic energy to force heat transfer from lower-temperature sources to higher-temperature sinks by employing a porous medium to maintain a continuous temperature gradient. In thermoacoustic refrigerators, environmentally friendly gases are used as the thermodynamic working fluid. In addition to providing a clean technology, thermoacoustic technology has other interesting advantages, including a system with no moving parts, a simple structure, highly scalable components and requiring less equipment. Therefore, it has a longer estimated operating life than conventional refrigerators and requires less manufacturing and maintenance costs.

A thermoacoustic refrigerator of the standing wave variety typically includes a quarter-wavelength resonator (an open-closed tube) driven by an acoustic energy, typically from a loudspeaker or a thermoacoustic heat engine being run by a separate thermal energy source (solar or process waste heat is common). An important part of the thermoacoustic refrigerator is the stack, which has a large number of closely spaced adjacent surfaces aligned parallel to the length of the resonator tube. The stack may be constructed by winding a roll of 35-mm photographic film in an example. Lengths of a nylon fishing line may be used to separate adjacent layers of the spirally wound film stack so that air could oscillate longitudinally between the layers along the length of the stack parallel to the length of the resonator tube. The thermoacoustic effect (i.e., the formation of a longitudinal temperature gradient) is created along the porous structure of the stack.

SUMMARY

Embodiments of the present invention are directed to apparatuses and methods for providing thermoacoustic heating and cooling systems. A thermoacoustic stack permits the formation and maintenance of a thermal temperature gradient in the way of a sustained acoustic disturbance, permitting the forced movement of thermal energy from a region of lower temperature to a region of higher temperature. Specific embodiments provide thermoacoustic stacks of unique geometry and construction specifically designed for additive manufacturing techniques using polymer materials with a relatively low thermal conductivity and a relatively high heat capacity. To enhance the rate at which heat is "pumped" through the stack by the acoustic work energy, heat exchangers have been designed and fabricated to extract thermal energy from the warm end of the stack to be discharged to a heat sink and to transfer thermal energy from a refrigerated space to the cooler end of the stack. The warmer end of the stack must be at higher temperature than the environment to which heat is being rejected and the cooler end of the stack must be at lower temperature than the refrigerated space in order for the refrigerative effect to be realized.

An aspect is directed to a thermoacoustic stack comprising a cylindrical outer wall having a length extending between a first end and a second end. An internal wall structure is disposed inside the outer wall. The internal wall structure includes a plurality of spaced adjacent wall surfaces extending along the length of the outer wall to provide open flow passages between the spaced adjacent wall surfaces. Embodiments include a structure with a first cross member extends across the outer wall at the first end and is connected to the outer wall and the internal wall structure at the first end.

A thermoacoustic system may comprise the thermoacoustic stack, a first heat exchanger connected with the outer wall at the first end, and a second heat exchanger connected with the outer wall at the second end. At least one of the first heat exchanger and the second heat exchanger may have a perforated core region including a plurality of parallel longitudinal openings and may be of a recessed construction to form a female socket into which a resonating tube recesses to make a male-to-female connection. At least one of the first heat exchanger and the second heat exchanger may have a channel to receive a fluid passing therethrough to absorb or discharge heat.

Another aspect is directed to a thermoacoustic stack comprising a cylindrical outer wall having a length extending between a first end and a second end. An internal wall structure is disposed inside the outer wall. The internal wall structure includes a spiral wall having an outer edge connected to an interior surface of the outer wall and an inner edge spiraling circumferentially outward to the outer edge. The spiral wall includes adjacent wall surfaces which are spaced to provide open flow passages therebetween. The adjacent wall surfaces extend along the length of the outer wall to provide the open flow passages. A first cross member extends across the outer wall at the first end and is connected to the outer wall and the spiral wall at the first end.

In embodiments, the inner wall structure may have one or more through passages between interior walls allowing flow between inner wall surfaces.

Yet another aspect is directed to a thermoacoustic stack comprising a cylindrical outer wall having a length extending between a first end and a second end. A spiral wall has an inner edge spiraling circumferentially outward to an outer edge connected to an interior surface of the outer wall. The spiral wall extends parallel to the length of the outer wall to provide a spiral-shaped open flow passage between adjacent wall surfaces of the spiral wall. A first cross member extends across the outer wall at the first end and is connected to the outer wall and the spiral wall at the first end.

Other features and aspects of various embodiments will become apparent to those of ordinary skill in the art from the following detailed description which discloses, in conjunction with the accompanying drawings, examples that explain features in accordance with embodiments. This summary is not intended to identify key or essential features, nor is it intended to limit the scope of the invention, which is defined solely by the claims.

BRIEF DESCRIPTION OF THE DRAWINGS

The attached drawings disclose the embodiments.

FIG. 2A is an oblique front elevational view of a spiral-channel stack according to an embodiment, FIG. 2B is a left end view thereof, and FIG. 2C is a right end view thereof FIG. 3A is an oblique front elevational view of a spiral-channel stack according to another embodiment, FIG. 3B is a left end view thereof, FIG. 3C is an oblique rear elevational view thereof, and FIG. 3D is a right end view thereof.

FIG. 4A is a perspective view of a slot-channel stack according to another embodiment and FIG. 4B is an end view thereof.

FIG. 5A is a perspective view of a tube-channel stack according to another embodiment and FIG. 5B is an end view thereof.

FIG. 6A is a perspective view of a recessed-type external-loop fluid-enhanced heat exchanger according to an embodiment, FIG. 6B is a perspective view thereof showing the external loop fluid passages, and FIG. 6C is an internal end view thereof.

FIG. 7A is a perspective view of a protruding-type fluid-enhanced heat exchanger according to an embodiment, FIG. 7B is a perspective view thereof showing the fluid passages, and FIG. 7C is an internal end view thereof.

FIG. 8A is a perspective view of a protruding-type passive heat exchanger according to an embodiment and FIG. 8B is an internal end view thereof.

FIG. 9A is a perspective view of a constructed refrigerative assembly and FIG. 9B is a perspective view thereof with internal features shown in broken lines, illustrating, in the circled portion, the recessed-type fluid-enhanced heat exchanger on the right side of the stack, a spiral-type stack, and a protruding-type fluid-enhanced heat exchanger on the left side.

DETAILED DESCRIPTION

Figure 1:
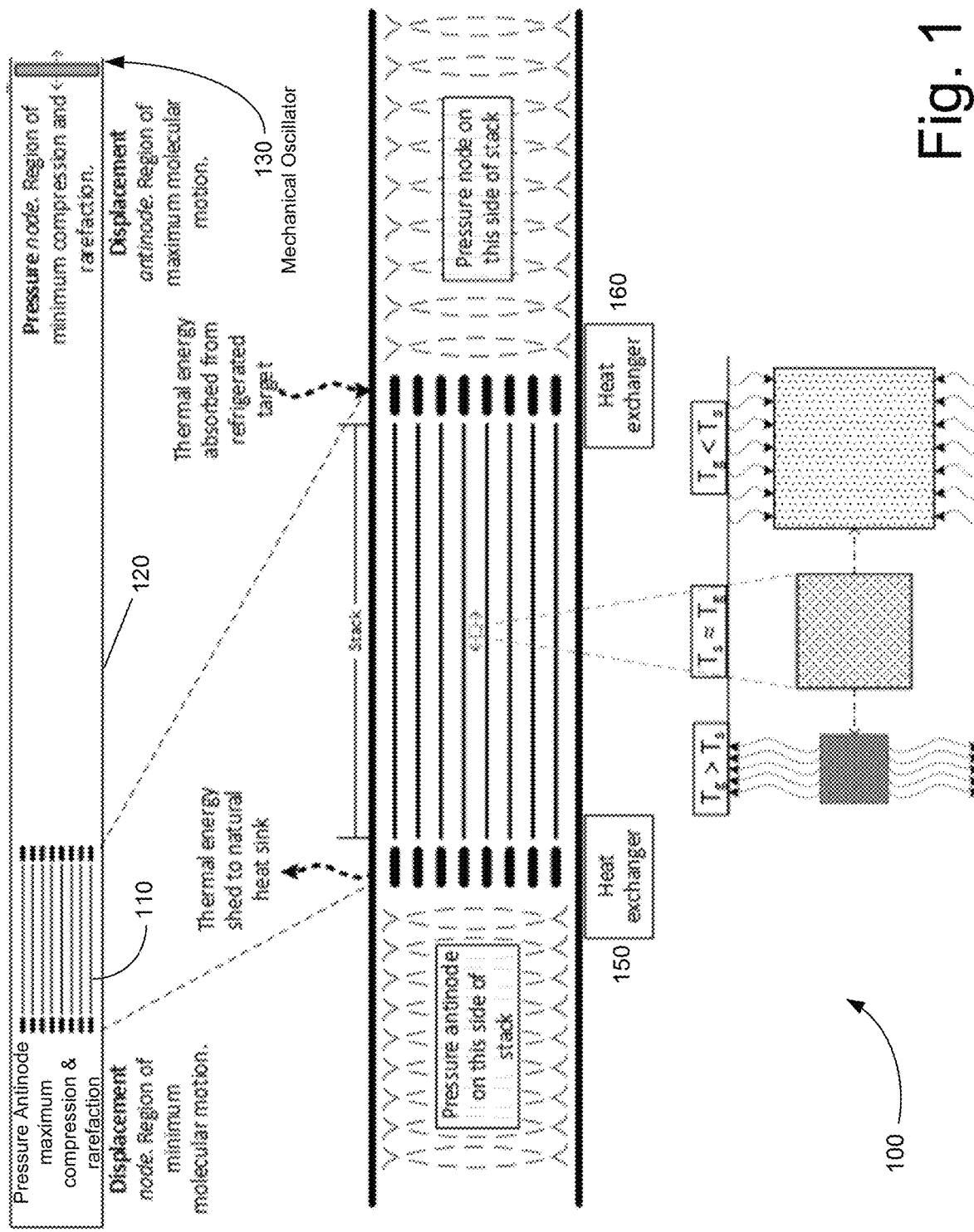
FIG. 1 schematically illustrates a thermoacoustic refrigeration apparatus which includes a thermoacoustic stack with heat exchangers wherein compressible gas parcels oscillate longitudinally through the thermoacoustic stack due to an acoustic standing wave.

A number of examples or embodiments of the present invention are described and disclosed herein. The present invention provides many applicable inventive concepts that have been disclosed and can be embodied in a variety of ways. Rather, as will be appreciated by one of skill in the art, the teachings and disclosures herein can be combined or rearranged with other portions of this disclosure along with the knowledge of one of ordinary skill in the art. Mechanical and Thermal Interactions in Thermoacoustic Stack FIG. 1 schematically illustrates a thermoacoustic refrigeration apparatus which includes a thermoacoustic stack with heat exchangers wherein compressible gas parcels oscillate longitudinally through the thermoacoustic stack due to an acoustic standing wave. The schematic view of FIG. 1 illustrates the basic theory of a thermoacoustic refrigeration apparatus 100 by showing mechanical and thermal interactions. A thermoacoustic stack 110 is disposed along a length of a resonating tube 120 through which gas travels (leftward and rightward in the example shown). On the right side of the resonating tube is a mechanical oscillator 130 that can be used to produce acoustic disturbance.

Compressible gas "parcels" oscillate longitudinally throughout the stack due to an acoustic standing wave. When moving toward the pressure antinode (leftward, as shown), the parcel encounters higher pressure and its temperature rises as a result of nearly adiabatic compression, allowing it to shed thermal energy to the relatively cooler local portion of the stack surface. As seen in the example of FIG. 1, the pressure antinode on the left side is a region of maximum compression and rarefaction. It is also referred to as a displacement node which is a region of minimum molecular motion.

Next, the parcel travels toward the pressure node (rightward, as shown) and experiences rarefaction, causing its temperature to drop as a result of nearly adiabatic expansion, permitting the absorption of thermal energy from the relatively warmer local stack surface. As seen in FIG. 1, the pressure node on the right side is a region of minimum compression and rarefaction. It is also referred to as a displacement antinode which is a region of maximum molecular motion.

In this way, adjacent gas parcels incrementally "pump" a net positive amount of thermal energy toward the pressure antinode (leftward). Removal of the aggregate thermal energy at the warm end (left side as shown) of the stack via a warm side heat exchanger 150 permits continued absorption of low-temperature thermal energy from a refrigerated target at the cool end (right side as shown) of the stack 110 via a cool side heat exchanger 160.

Embodiments

The thermoacoustic stack provides narrow longitudinal channel(s) between adjacent wall surfaces oriented parallel to the propagation of directionally bound acoustic disturbances in a standing-wave resonating chamber or tube. Due to oscillatory movement of the thermoacoustic medium (e.g., compressible gas in a tested embodiment) and position-based oscillatory pressurization, the microscopically scaled constituent "parcels" of the medium simultaneously travel longitudinally toward one end of the stack and experience greater pressure (leftward travel toward the left end in FIG. 1). As such, they experience polytropic compression, with a polytropic exponent nearing the value yielding adiabatic compression. This compression causes each constituent to experience a rise in temperature.

A main function of the stack is to create a temperature gradient by absorbing a large amount of heat. The spacing between adjacent wall surfaces of the stack is determined by the thermal penetration depth, $\delta_k$. The thermal penetration depth is the distance over which effective heat transfer may occur between the gas parcel and an adjacent surface. On the one hand, the spacing should be as small as possible so that more gas is available within this region to increase the heat interaction between the working gas and the stack surface along with an increase in the heat transfer area. On the other hand, a spacing that is very small may create pressure disturbance near the stack and restrict the oscillatory displacement of the gas through viscous influence. In an embodiment, the stack wall spacing is typically between $2\delta_k$ and $4 \delta_k$ (e.g., $3 \delta_k$).

FIG. 1 illustrates the theory behind the thermoacoustic apparatus while FIGS. 9A and 9B illustrate a prototyped embodiment. Because each constituent is within the thermal penetration depth region of the stack channel's walls, the higher-temperature compressed medium is able to transfer thermal energy to the stack whenever its temperature exceeds the stack material's temperature. Conversely, when the acoustic standing wave causes movement of the medium toward the other end of the stack (rightward travel toward the right end in FIG. 1), the pressure decreases and the constituent parcel expands polytropically (again, nearing the adiabatic threshold); its temperature decreases accordingly. Since the parcel had just relinquished some of its thermal energy to the warmer end (left end in FIG. 1) of the stack, its temperature now drops further and, in aggregate, provides a refrigerative effect. If heat exchangers are placed at either end of the stack, with the warmer (i.e., compressively heated) end of the stack shedding its heat to the ambient environment and the cooler (i.e., expanded) end connected to a refrigerated environment, the stack allows the mechanically induced acoustic standing wave to act as a refrigerator. The stack "pumps" thermal energy from the cooler end to the warmer end via mechanically induced longitudinal motion of the thermoacoustic medium within the stack.

In one embodiment, the stack is manufactured by 3D printing additively with PLA (polylactic acid) filament. 3D printing provides an effective technique for creating the flow path shape of the stack. Polylactic acid can easily be fabricated into the desired geometries via extruded additive manufacturing techniques, has a relatively high heat capacity, and has a relatively low thermal conductivity to discourage the longitudinal migration of thermal energy within the stack itself, which maintains the desired thermal gradient. When a tighter tolerance is desired, stereolithographic techniques using resin may be ideal, as it also possesses low thermal conductivity. Maintenance of the longitudinal thermal gradient can be further enhanced via microscopic conduction disruption effects inherent of very thin geometries.

General polytropic process:

$$Pv^n = \text{Constant} \Rightarrow P_1 v_1^n = P_2 v_2^n$$

$$n_{adiabatic} = \gamma = \frac{c_p}{c_v} = \frac{1.005 \frac{kJ}{kg \cdot K}}{0.718 \frac{kJ}{kg \cdot K}} = 1.4 \text{ (for air at room temperature)}$$

Adiabatic process: $P_1 v_1^{1.4} = P_2 v_2^{1.4}$ where P is pressure and v is volume of the thermoacoustic system.

The following describes examples of three different channel configurations: 1) single-channel bound by a spiral wall (e.g., spiral stack geometry), 2) multi-channel "slots" bound by linear walls (e.g., parallel stack geometry), and 3) multi-channel square tubes arranged in a grid (e.g., pin array stack geometry).

FIG. 2A is an oblique front elevational view of a spiral-channel stack according to an embodiment, FIG. 2B is a left end view thereof, and FIG. 2C is a right end view thereof The spiral-channel stack 200 includes a spiral wall 210 disposed inside an outer wall 220. The outer wall 220 has a length extending between a first end and a second end. In the embodiment shown, the outer wall 220 is a circular cylindrical wall, but other geometrical shapes may be used in other embodiments (e.g., elliptical or polygonal).

An internal wall structure is disposed inside the outer wall and may extend between the first end and the second end. The internal wall structure includes a plurality of spaced adjacent wall surfaces extending along the length of the outer wall between the first end and the second end to provide open flow passages between the spaced adjacent wall surfaces. The open flow passages may extend between the first end and the second end. In general, the internal wall structure may include a plurality of adjacent wall surfaces that are substantially parallel to the length of the outer wall (e.g., parallel±5° or parallel±1°).

In this embodiment, the internal wall structure includes a spiral wall. The spiral wall 210 has an outer edge connected to an interior surface of the outer wall 220 and an inner edge spiraling circumferentially outward to the outer edge. The inner edge may be disposed at a center of the cross-sectional opening provided by the outer wall 220. The spiral wall 210 may extend parallel to the length of the outer wall 220 between the first end and the second end to provide a spiral-shaped open flow passage between adjacent wall surfaces of the spiral wall.

The spiral wall 210 has closely spaced adjacent surfaces aligned parallel to the length of the resonator tube 120. The stack may be constructed by 3D printing additively with PLA resin. 3D printing provides an effective technique for creating the flow path shape of the stack. PLA can be fabricated easily into the desired geometries via extruded additive manufacturing techniques, has a relatively high heat capacity, and has a relatively low thermal conductivity to discourage the longitudinal migration of thermal energy within the stack itself, which maintains the desired thermal gradient. When a tighter tolerance is desired, stereolithographic techniques using resin may be employed to provide a relatively low thermal conductivity.

3D printing generates closely spaced surfaces of the spiral wall 210 having a uniform spacing (e.g., a deviation of less than ±20%, or less than ±10%, or less than ±5%). The spiral stack layers are a few thermal penetration depths apart (e.g., 2 to 4); in some cases, 4 thermal penetration depths may be the optimum layer separation. In one example, the thermal penetration depth is the square root of ((thermal conductivity)/(pi*standing wave frequency*density*isobaric specific heat per unit mass)). If the stack layers are too far apart, the gas cannot effectively transfer heat to and from the stack walls. If the stack layers are too close together, viscous effects hamper the motion of the gas particles.

To maintain the structural integrity or stability of the spiral wall 210 and the uniform stack spacing, one or more cross bars or cross members are provided at or near the two ends of the spiral-channel stack 200. FIGS. 2A to 2C show a first cross member 230 at the first end of the stack 200 and a second cross member 240 at the second end of the stack 200 opposite from the first end. The first cross member 230 extends across the spiral wall 210 of the stack 200 at the first end between the outer wall 220 and is connected to the spiral wall 210 at the first end. The second cross member 240 extends across the spiral wall 210 of the stack 200 at the second end between the outer wall 220 and is connected to the spiral wall 210 at the second end. The cross members may be formed integrally with the outer wall 220 and the spiral wall 210 by 3D printing or the like.

In the embodiment shown, the first cross member 230 and the second cross member 240 are circumferentially spaced from one another by an angle. The angle may be about 45 to 135 degrees, or about 60 to 120 degrees, or about 75 to 105 degrees, or about 90 degrees (e.g., 90° ±5%).

FIG. 3A is an oblique front elevational view of a spiral-channel stack according to another embodiment, FIG. 3B is a left end view thereof, FIG. 3C is an oblique rear elevational view thereof, and FIG. 3D is a right end view thereof. The spiral-channel stack 300 includes a spiral wall 310 disposed inside an outer wall 320. The spiral-channel stack 300 is similar to the spiral-channel stack 200 of FIGS. 2A-2C.

The spiral-channel stack 300 has two cross members 330, 340 at a first end of the stack to stabilize the spiral wall structure and no cross members at the second end of the stack. The cross members 330, 340 each extend across the spiral wall 310 of the stack 300 at the first end between the outer wall 320 and are connected to the spiral wall 310 at the first end. The cross members may be formed integrally with the outer wall 320 and the spiral wall 310 by 3D printing or the like. The first cross member 330 and the second cross member 340 are circumferentially spaced from one another by a circumferential angle. The angle may be about 45 to 135 degrees, or about 60 to 120 degrees, or about 75 to 105 degrees, or about 90 degrees (e.g., 90°±5%).

When the first cross member (230, 330) and/or the second cross member (240, 340) are connected to the first end or the second end of the stack, they cover a portion of an area of an outer wall opening surrounded by the outer wall (220, 320) at the first end or the second end. The covered portion is generally kept to a minimum. For example, the covered portion but the cross members may be less than about 5% or less than about 1% of the area of the outer wall opening.

FIG. 4A is a perspective view of a slot-channel stack according to another embodiment and FIG. 4B is an end view thereof. The slot-channel stack 400 includes a plurality of parallel walls 410 disposed inside an outer wall 420. The parallel walls 410 are substantially uniformly spaced (e.g., uniform spacing ±10% deviation). In the embodiment shown, the outer wall 420 is a circular cylindrical wall, but other geometrical shapes may be used in other embodiments. The parallel walls 410 have closely spaced adjacent surfaces aligned parallel to the length of the resonator tube 120. The stack may be constructed by 3D printing additively with PLA resin. The slot-channel stack layers (i.e., parallel walls 410) are a few thermal penetration depths apart (e.g., 2 to 4).

The parallel walls 410 typically are structurally more stable than the spiral wall 310 of FIGS. 2A-3C. If additional structural stability is desired, a cross member similar to those shown in FIGS. 2A-3C may be added. In one example, a cross member may be provided at or near one end of the slot-channel stack 400 and extend between the outer wall 420 perpendicularly to the parallel walls 410. The cross member is connected to the parallel walls 410. In another example, another cross member may be provided at or near an opposite end of the slot-channel stack 400 and extend between the outer wall 420 perpendicularly to the parallel walls 410 at the opposite end. The cross member(s) may be formed integrally with the outer wall 420 and the parallel walls 410 by 3D printing or the like.

FIG. 5A is a perspective view of a tube-channel stack according to another embodiment and FIG. 5B is an end view thereof. The tube-channel stack 500 includes a plurality of uniformly spaced parallel and transverse walls 510 disposed inside an outer wall 520. In the embodiment shown, the outer wall 520 is a circular cylindrical wall, but other geometrical shapes may be used in other embodiments. The parallel and transverse walls 510 have closely spaced adjacent surfaces aligned parallel to the length of the resonator tube 120. The stack may be constructed by 3D printing additively with PLA resin. The tube-channel stack layers are a few thermal penetration depths apart (e.g., 2 to 4). The plurality of parallel walls are substantially uniformly spaced (e.g., uniform spacing ±10% deviation) and the plurality of transverse walls are substantially uniformly spaced (e.g., uniform spacing ±10% deviation) and substantially perpendicular to the parallel walls (e.g., 90°±10°).

The parallel and transverse walls 510 are relatively more stable structurally than the spiral wall 310 of FIGS. 2A-3C and the parallel walls 410 of FIGS. 4A-4C. If additional structural stability is desired, a cross member similar to those shown in FIGS. 2A-3C may be added. In one example, a first cross member may be provided at or near a first end of the slot-channel stack 500 and extend between the outer wall 520 at an angle of about 45° to the parallel and transverse walls 510. The first cross member is connected to the parallel and transverse walls 510. In another example, an additional second cross member may be provided at or near a second end of the tube-channel stack 500 opposite from the first end and extend between the outer wall 520 at an angle of about 45° to the parallel and transverse walls 510 at the second end. The second cross member may be parallel to or disposed at a circumferential angle relative to the first cross member. In one example, the first and second cross members may be circumferentially spaced by about 90° in a manner similar to those shown in FIGS. 2A-2C. The cross member(s) may be formed integrally with the outer wall 520 and the parallel and transverse walls 510 by 3D printing or the like.

FIG. 6A is a perspective view of a recessed-type external-loop fluid-enhanced heat exchanger 600 according to an embodiment, FIG. 6B is a perspective view thereof showing the external loop fluid passages, and FIG. 6C is an internal end view thereof.

This heat exchanger 600 may be constructed of a material with a large thermal conductivity (e.g., greater than about 80 W/m-K or greater than about 150 W/m-K) and a low heat capacity (e.g., lower than about 1200 J/kg-K or lower than about 900 J/kg-K). An example is aluminum alloy which was used in a prototype due to its ease of machinability and machining equipment available to the inventors. Copper would be another viable material and silver would be the best. The heat exchanger 600 has a perforated core region 610 including a plurality of parallel longitudinal openings 612 through which acoustic waves may propagate and a U-shaped channel 620 through which a thermal fluid may flow to absorb or discharge heat. The perforated core region 610 is of a recessed construction to form a female portion or socket into which the resonating tube recesses to make a male-to-female connection. When placed on the warm end of the stack, the heat exchanger solid material directly absorbs thermal energy from the warm end of the stack and passes it to the fluid, which advects it away via bulk fluid motion precipitated by a pump through the U-shaped channel 620. Similarly, at the cold end, a thermal fluid sheds thermal energy to the heat exchanger solid material, which is then absorbed by the thermoacoustic medium only to be "pumped" up the stack to the warmer end.

FIG. 7A is a perspective view of a protruding-type fluid-enhanced heat exchanger according to an embodiment, FIG. 7B is a perspective view thereof showing the fluid passages, and FIG. 7C is an internal end view thereof.

This heat exchanger 700 may be constructed of a material with a large thermal conductivity and a low heat capacity, similar to the heat exchanger 600. An example is aluminum alloy. The heat exchanger 700 has a protruding perforated core region 710 including parallel longitudinal openings 712 through which acoustic waves may propagate and parallel channels 720 penetrating the core through which a thermal fluid may flow to absorb or discharge heat. The channels 720 displace areas where perforations could be, somewhat limiting the free area through which acoustic energy may propagate. When placed on the warm end of the stack, the heat exchanger solid material directly absorbs thermal energy from the warm end of the stack and passes it to the fluid, which advects it away via bulk fluid motion precipitated by a pump. Similarly, at the cold end, a thermal fluid sheds thermal energy to the heat exchanger solid material, which is then absorbed by the thermoacoustic medium only to be "pumped" up the stack to the warmer end. The design of the heat exchanger 700 is such that it provides a protruding male plug that recesses into the resonating tube.

FIG. 8A is a perspective view of a protruding-type passive heat exchanger according to an embodiment and FIG. 8B is an internal end view thereof. This heat exchanger 800 may be constructed of a material with a large thermal conductivity and a low heat capacity, similar to the heat exchanger 600. An example is aluminum alloy. The heat exchanger 800 has a protruding perforated core region 810 including a plurality of parallel longitudinal openings through which acoustic waves may propagate and an external surface 820 through which heat may be transferred by convection to or from the immersed environment. When placed on the warm end of the stack, the heat exchanger solid material directly absorbs thermal energy from the warm end of the stack and passes it to the outermost surface 820, which communicates via free or forced convection with the immersed environment. Similarly, at the cold end, a relatively cooler immersed environment sheds thermal energy to the heat exchanger's outer surface 820, which is then absorbed by the thermoacoustic medium only to be "pumped" up the stack to the warmer end. The design of the heat exchanger 800 is such that it provides a male plug that recesses into the resonating tube.

FIG. 9A is a perspective view of a constructed refrigerative assembly 900 in which a thermoacoustic stack 910 is disposed along a length of a resonating tube 920 through which gas travels (leftward and rightward in the example shown). The stack 910 is a spiral-type stack in a prototype. On the right side of the resonating tube 920 is a mechanical oscillator 930 such as a loudspeaker that can be used to produce a standing wave proportional to the length of the resonating tube. The stack 910 is connected to a left-side heat exchanger at a left end or first end and is connected to a right-side heat exchanger at a right end or second end. A left portion of the resonating tube 920 is connected to the left-side heat exchanger. A right portion of the resonating tube 920 is connected to the right-side heat exchanger.

FIG. 9B is a perspective view of the refrigerative or cooling assembly 900 with internal features shown in broken lines, illustrating, in the circled portion, the recessed-type fluid-enhanced heat exchanger 600 on the right side of the stack 910 as the right-side heat exchanger and a protruding-type fluid-enhanced heat exchanger 700 on the left side of the stack 910 as the left-side heat exchanger. Other embodiments may include a different stack, different heat exchangers, and/or a different mechanical oscillator.

The inventive concepts taught by way of the examples discussed above are amenable to modification, rearrangement, and embodiment in several ways. For example, this invention may be applicable in other systems having different geometries, sizes, or arrangements of components. Accordingly, although the present disclosure has been described with reference to specific embodiments and examples, persons skilled in the art will recognize that changes may be made in form and detail without departing from the spirit and scope of the disclosure.

An interpretation under 35 U.S.C. § 112(f) is desired only where this description and/or the claims use specific terminology historically recognized to invoke the benefit of interpretation, such as "means," and the structure corresponding to a recited function, to include the equivalents thereof, as permitted to the fullest extent of the law and this written description, may include the disclosure, the accompanying claims, and the drawings, as they would be understood by one of skill in the art.

To the extent the subject matter has been described in language specific to structural features or methodological steps, it is to be understood that the subject matter defined in the appended claims is not necessarily limited to the specific features or steps described. Rather, the specific features and steps are disclosed as example forms of implementing the claimed subject matter. To the extent headings are used, they are provided for the convenience of the reader and are not be taken as limiting or restricting the systems, techniques, approaches, methods, or devices to those appearing in any section. Rather, the teachings and disclosures herein can be combined or rearranged with other portions of this disclosure and the knowledge of one of ordinary skill in the art. It is intended that this disclosure encompass and include such variation.

The indication of any elements or steps as "optional" does not indicate that all other or any other elements or steps are mandatory. The claims define the invention and form part of the specification. Limitations from the written description are not to be read into the claims.

What is claimed is:

1. A thermoacoustic stack comprising:
   an outer wall which is cylindrical and has a length extending between a first end and a second end;
   an internal wall structure disposed inside the outer wall, the internal wall structure including a plurality of spaced adjacent wall surfaces extending along the length of the outer wall to provide open flow passages between the spaced adjacent wall surfaces;
   a first cross member extending across the outer wall at the first end and connected to the outer wall and the internal wall structure at the first end; and
   a second cross member extending across the outer wall at the second end and connected to the outer wall and the internal wall structure at the second end;
   the second cross member being circumferentially spaced from the first cross member by a circumferential angle;
   the circumferential angle being about 90 degrees.

2. The thermoacoustic stack of claim 1,
   wherein the first cross member covers a portion of an area of a first end outer wall opening surrounded by the outer wall at the first end, the portion being less than about 1% of the area of the first end outer wall opening.

3. The thermoacoustic stack of claim 1,
   wherein the second cross member covers a portion of an area of a second end outer wall opening surrounded by the outer wall at the second end, the portion being less than about 1% of the area of the second end outer wall opening.

4. A thermoacoustic stack comprising:
   an outer wall which is cylindrical and has a length extending between a first end and a second end;
   an internal wall structure disposed inside the outer wall, the internal wall structure including a plurality of spaced adjacent wall surfaces extending along the length of the outer wall to provide open flow passages between the spaced adjacent wall surfaces;

a first cross member extending across the outer wall at the first end and connected to the outer wall and the internal wall structure at the first end; and a second cross member extending across the outer wall at the second end and connected to the outer wall and the internal wall structure at the second end;

the second cross member being circumferentially spaced from the first cross member by a circumferential angle;

the internal wall structure comprising a spiral wall having an outer edge connected to an interior surface of the outer wall and an inner edge spiraling circumferentially outward to the outer edge, the spiral wall including the adjacent wall surfaces which are spaced to provide the open flow passages therebetween extending between the first end and the second end; and the spaced adjacent wall surfaces being substantially uniformly spaced by a space of about 2 to 4 thermal penetration depths of the thermoacoustic stack.

5. The thermoacoustic stack of claim 1, further comprising:

a third cross member extending across the outer wall at the first end and connected to the outer wall and the internal wall structure at the first end;

wherein the third cross member is circumferentially spaced from the first cross member by a third cross-member circumferential angle.

6. The thermoacoustic stack of claim 5, wherein the third cross-member circumferential angle is about 90 degrees.

7. The thermoacoustic stack of claim 5, wherein the first cross member and the third cross member cover a portion of an area of a first end outer wall opening surrounded by the outer wall at the first end, the portion being less than about 1% of the area of the first end outer wall opening.

8. The thermoacoustic stack of claim 1, wherein the internal wall structure comprises a plurality of parallel walls which are substantially uniformly spaced.

9. The thermoacoustic stack of claim 1, wherein the internal wall structure comprises a plurality of parallel walls which are substantially uniformly spaced and a plurality of transverse walls which are substantially uniformly spaced and substantially perpendicular to the parallel walls.

10. The thermoacoustic stack of claim 1, wherein the spaced adjacent wall surfaces are aligned parallel to the length of the outer wall.

11. The thermoacoustic stack of claim 1, formed by 3D printing additively with PLA (polylactic acid) resin.

12. A thermoacoustic system comprising:

the thermoacoustic stack of claim 1;

a first heat exchanger connected with the outer wall at the first end; and a second heat exchanger connected with the outer wall at the second end;

wherein the first heat exchanger and the second heat exchanger each have a perforated core region including a plurality of parallel longitudinal openings and wherein at least one of the first heat exchange and the second heat exchanger is of a recessed construction to form a female socket into which a resonating tube recesses to make a male-to-female connection.

13. The thermoacoustic system of claim 12, wherein at least one of the first heat exchanger and the second heat exchanger has a channel to receive a fluid passing therethrough to absorb or discharge heat.

14. The thermoacoustic stack of claim 4, wherein the circumferential angle is about 90 degrees.

15. The thermoacoustic stack of claim 4, wherein the second cross member comprises a cross bar.

16. A thermoacoustic stack comprising:

an outer wall which is cylindrical and has a length extending between a first end and a second end;

an internal wall structure disposed inside the outer wall, the internal wall structure including a plurality of spaced adjacent wall surfaces extending along the length of the outer wall to provide open flow passages between the spaced adjacent wall surfaces;

a first cross member extending across the outer wall at the first end and connected to the outer wall and the internal wall structure at the first end; and a second cross member extending across the outer wall at the second end and connected to the outer wall and the internal wall structure at the second end;

the second cross member being circumferentially spaced from the first cross member by a circumferential angle;

the spaced adjacent wall surfaces being substantially uniformly spaced by a space of about 2 to 4 thermal penetration depths of the thermoacoustic stack.

17. A thermoacoustic stack comprising:

an outer wall which is cylindrical and has a length extending between a first end and a second end;

an internal wall structure disposed inside the outer wall, the internal wall structure including a spiral wall having an outer edge connected to an interior surface of the outer wall and an inner edge spiraling circumferentially outward to the outer edge, the spiral wall including adjacent wall surfaces which are spaced to provide open flow passages therebetween, the adjacent wall surfaces extending along the length of the outer wall to provide the open flow passages;

a first cross member extending across the outer wall at the first end and connected to the outer wall and the spiral wall at the first end; and a second cross member extending across the outer wall at the second end and connected to the outer wall and the internal wall structure at the second end;

the second cross member being circumferentially spaced from the first cross member by a circumferential angle;

the circumferential angle being about 90 degrees.

18. The thermoacoustic stack of claim 17, further comprising:

wherein the first cross member covers a portion of an area of a first end outer wall opening surrounded by the outer wall at the first end, the portion being less than about 1% of the area of the first end outer wall opening; and wherein the second cross member covers a portion of an area of a second end outer wall opening surrounded by the outer wall at the second end, the portion being less than about 1% of the area of the second end outer wall opening.

19. The thermoacoustic stack of claim 17, further comprising:

a third cross member extending across the outer wall at the first end and connected to the outer wall and the internal wall structure at the first end;

wherein the third cross member is circumferentially spaced from the first cross member by a third cross-member circumferential angle.

20. The thermoacoustic stack of claim 19, wherein the third cross-member circumferential angle is about 90 degrees.

21. The thermoacoustic stack of claim 17, formed by 3D printing additively with PLA (polylactic acid) resin.

22. The thermoacoustic stack of claim 17,
wherein the spaced adjacent wall surfaces are substantially uniformly spaced by a space of about 2 to 4 thermal penetration depths of the thermoacoustic stack.

23. A thermoacoustic stack comprising:
an outer wall which is cylindrical and has a length extending between a first end and a second end;
an internal wall structure disposed inside the outer wall, the internal wall structure including a spiral wall having an outer edge connected to an interior surface of the outer wall and an inner edge spiraling circumferentially outward to the outer edge, the spiral wall including adjacent wall surfaces which are spaced to provide open flow passages therebetween, the adjacent wall surfaces extending along the length of the outer wall to provide the open flow passages;
a first cross member extending across the outer wall at the first end and connected to the outer wall and the spiral wall at the first end; and
a second cross member extending across the outer wall at the second end and connected to the outer wall and the internal wall structure at the second end;
the second cross member being circumferentially spaced from the first cross member by a circumferential angle;
the spaced adjacent wall surfaces being aligned parallel to the length of the outer wall and are substantially uniformly spaced by a space of about 2 to 4 thermal penetration depths of the thermoacoustic stack.

24. A thermoacoustic stack comprising:
an outer wall which is cylindrical and has a length extending between a first end and a second end;
a spiral wall having an inner edge spiraling circumferentially outward to an outer edge connected to an interior surface of the outer wall, the spiral wall extending parallel to the length of the outer wall between the first end and the second end to provide a spiral-shaped open flow passage between adjacent wall surfaces of the spiral wall;
a first cross member extending across the outer wall at the first end and connected to the outer wall and the spiral wall at the first end;
a second cross member extending across the outer wall at the second end and connected to the outer wall and the spiral wall at the second end; and
the second cross member being circumferentially spaced from the first cross member by about 90 degrees.

25. The thermoacoustic stack of claim 24 wherein the first cross member comprises a first cross bar and the second cross member comprises a second cross bar.

26. The thermoacoustic stack of claim 24, further comprising:
a third cross member extending across the outer wall at the first end and connected to the outer wall and the spiral wall at the first end;
wherein the third cross member is circumferentially spaced from the first cross member by about 90 degrees; and
wherein the first cross member and third cross member cover a portion of an area of a first end outer wall opening surrounded by the outer wall at the first end, the portion being less than about 1% of the area of the first end outer wall opening.

27. The thermoacoustic stack of claim 24,
wherein the first cross member covers a portion of an area of a first end outer wall opening surrounded by the outer wall at the first end, the portion being less than about 1% of the area of the first end outer wall opening; and
wherein the second cross member covers a portion of an area of a second end outer wall opening surrounded by the outer wall at the second end, the portion being less than about 1% of the area of the second end outer wall opening.

28. The thermoacoustic stack of claim 24, formed by 3D printing additively with PLA (polylactic acid) resin.

\* \* \* \* \*